United States Patent
Blouet et al.

(10) Patent No.: US 12,406,677 B2
(45) Date of Patent: Sep. 2, 2025

(54) METHODS AND SYSTEMS FOR CREATING A SYNTHETIC SPEECH DETECTION ALGORITHM AND ENHANCING DETECTION OF FRAUDULENT AUDIO DATA USING THE ALGORITHM

(71) Applicant: Daon Technology, Dublin (IE)

(72) Inventors: Raphael Blouet, Talence (FR); Ana Mantecon, Madrid (ES); Linas Balciunas, Kaunas (LT)

(73) Assignee: Daon Technology, Douglas (IM)

( * ) Notice: Subject to any disclaimer, the term of this patent is extended or adjusted under 35 U.S.C. 154(b) by 234 days.

(21) Appl. No.: 18/350,147

(22) Filed: Jul. 11, 2023

(65) Prior Publication Data
US 2025/0022472 A1 Jan. 16, 2025

(51) Int. Cl.
G10L 17/26 (2013.01)
G10L 13/02 (2013.01)
G10L 17/04 (2013.01)

(52) U.S. Cl.
CPC .............. G10L 17/26 (2013.01); G10L 13/02 (2013.01); G10L 17/04 (2013.01)

(58) Field of Classification Search
CPC ......... G10L 17/26; G10L 13/02; G10L 17/04; G10L 17/18; G10L 25/30; G10L 25/51; G06F 21/32
See application file for complete search history.

(56) References Cited

U.S. PATENT DOCUMENTS

| | | | |
|---|---|---|---|
| 9,865,253 B1* | 1/2018 | De Leon | G10L 25/90 |
| 11,955,122 B1* | 4/2024 | Ahmadi | G10L 15/18 |
| 2018/0254046 A1 | 9/2018 | Khoury et al. | |
| 2022/0172739 A1* | 6/2022 | Shor | G10L 15/02 |
| 2024/0005947 A1* | 1/2024 | Wang | G10L 25/51 |

OTHER PUBLICATIONS

Search Report and Opinion for related EPO Application No. 24187562.4, dated Jan. 20, 2025, pp. 1-10.

* cited by examiner

*Primary Examiner* — Huyen X Vo
(74) *Attorney, Agent, or Firm* — Kevin McDermott, Esq.

(57) ABSTRACT

A method of creating an algorithm to enhance detection of fraudulent audio data is provided that includes generating, by an electronic device, audio data using a synthetic speech creation algorithm, processing the generated audio data using a synthetic speech detection algorithm, determining whether the synthetic speech detection algorithm detects the generated audio data, generating additional audio data using the synthetic speech creation algorithm, and creating a database including the generated audio data and genuine data. When the synthetic speech detection algorithm failed to detect the generated audio data, the synthetic speech detection algorithm is divided into a first algorithm and a second algorithm. The second algorithm is fine-tuned using the data in the created database. The first algorithm and the fine-tuned second algorithm are combined to create a fine-tuned synthetic speech detection algorithm for enhancing detection of fraudulent audio data generated by the synthetic speech creation algorithm.

12 Claims, 7 Drawing Sheets

METHODS AND SYSTEMS FOR CREATING A SYNTHETIC SPEECH DETECTION ALGORITHM AND ENHANCING DETECTION OF FRAUDULENT AUDIO DATA USING THE ALGORITHM

BACKGROUND OF THE INVENTION

This invention relates generally to detecting fraudulent audio data, and more particularly, to methods and systems for creating a synthetic speech detection algorithm and enhancing detection of fraudulent audio data using the algorithm.

Users are required to prove who they claim to be during authentication transactions conducted under many different circumstances. Claims of identity may be proven during authentication transactions based on audio data captured from the user. Imposters have been known to impersonate users by providing a false claim of identity supported by fraudulent biometric data to deceive a service provider into concluding the imposter is the person he or she claims to be. For example, imposters have been known to use tools to generate fraudulent audio data, for example, a speech signal that mimics genuine user voice and to present the generated speech signal during an authentication transaction to support a false claim of identity. Such impersonations are known as spoofing. Verifying that the biometric data presented during a network-based biometric authentication transaction conducted at a remote location is from a live person at the remote location, is known as liveness detection or anti-spoofing.

Voice Cloning detection (VCD) systems are known to train one or more classification models able to distinguish between bone fide utterances and fraudulent utterances generated synthetically by a synthetic speech creation algorithm, for example, a voice cloning algorithm. Training a cloned voice detection algorithm in a VCD system requires a training database that includes bona fide and fraudulent utterances. Fraudulent utterances are synthesized speech generated by one or more synthetic speech creation algorithms, for example, voice cloning algorithms. VCD systems are known to be more accurate when fraudulent utterances have been generated by the same synthetic speech creation algorithm, for example, as voice cloning algorithm used to generate whole or part of the VCD system training database. It is also known that results generated by VCD systems for detecting fraudulent utterances generated by a previously unencountered voice cloning algorithm or other synthetic speech creation algorithm typically do not meet desired accuracy requirements.

Updating a VCD system to detect fraudulent utterances generated by a previously unencountered synthetic speech creation algorithm, for example, voice cloning algorithm requires obtaining the unencountered algorithm, creating training data using the unencountered algorithm, and completely retraining from scratch the synthetic speech detection algorithm using the created training data and the data from the training database used to initially train the synthetic speech detection algorithm. The updates are complex, time consuming, and expensive to implement and are required for each unencountered synthetic speech creation algorithm. Additionally, the rate at which new synthetic speech creation algorithms are being developed is increasing which compounds the problems associated with updating synthetic speech detection systems.

Thus, it would be advantageous and an improvement over the relevant technology to provide a method, a computer, and a computer-readable recording medium capable of reducing training time and costs associated with updating VCD systems to enhance detection of synthesized speech generated by a recently developed unknown synthetic speech creation algorithm.

BRIEF DESCRIPTION OF THE INVENTION

A method of creating an algorithm to enhance detection of fraudulent audio data is provided that includes the steps of generating, by an electronic device, audio data using a synthetic speech creation algorithm, processing the generated audio data using a synthetic speech detection algorithm, determining whether the synthetic speech detection algorithm detects the generated audio data, generating additional audio data using the synthetic speech creation algorithm, and creating a database including the generated audio data and genuine data. In response to determining the synthetic speech detection algorithm failed to detect the generated audio data, the method includes dividing the synthetic speech detection algorithm into a first algorithm and a second algorithm and fine-tuning the second algorithm using the data in the created database. The fine-tuned second algorithm is different than the second algorithm. The first algorithm and the fine-tuned second algorithm are combined to create a fine-tuned synthetic speech detection algorithm for enhancing detection of fraudulent audio data generated by the synthetic speech creation algorithm.

In another embodiment of the present disclosure when the synthetic speech detection algorithm detects the generated audio data the synthetic speech detection algorithm is determined to be capable of detecting fraudulent audio data using audio data generated by the synthetic speech creation algorithm.

In another embodiment of the present disclosure the synthetic speech detection algorithm is created.

In yet another embodiment of the present disclosure the synthetic speech creation algorithm is a voice cloning algorithm.

Another aspect of the present disclosure provides a non-transitory computer-readable recording medium in an electronic device for creating an algorithm to enhance detection of fraudulent audio data. The non-transitory computer-readable recording medium stores instructions which when executed by a hardware processor performs the steps of the methods described above.

Another aspect of the present disclosure provides an electronic device for creating an algorithm to enhance detection of fraudulent audio data including a processor and a memory configured to store data. The electronic device is associated with a network and the memory is in communication with the processor and has instructions stored thereon which, when read and executed by the processor, cause the electronic device to generate audio data using a synthetic speech creation algorithm, process the generated audio data using a synthetic speech detection algorithm, determine whether the synthetic speech detection algorithm detects the generated audio data, generate additional audio data using the synthetic speech creation algorithm, and create a database including the generated audio data and genuine data.

In response to determining the detection algorithm failed to detect the generated audio data, the instructions when read and executed by the processor, cause the electronic device to divide the synthetic speech detection algorithm into a first algorithm and a second algorithm and fine-tune the second algorithm using the data in the created database. The fine-tuned second algorithm is different than the second algorithm. Moreover, the instructions when read and executed by the processor, cause the electronic device to combine the first algorithm and the fine-tuned second algorithm to create a fine-tuned synthetic speech detection algorithm for enhancing detection of fraudulent audio data generated by the synthetic speech creation algorithm.

In an embodiment of the present disclosure the instructions when read and executed by the processor, cause the electronic device to determine the detection algorithm is capable of detecting fraudulent audio data using audio data generated by the synthetic speech creation algorithm when the detection algorithm detects the generated audio data.

In another embodiment of the present disclosure the instructions when read and executed by the processor, cause the electronic device to create the synthetic speech detection algorithm.

In yet another embodiment of the present disclosure for the electronic device, the synthetic speech creation algorithm is a voice cloning algorithm.

DETAILED DESCRIPTION OF THE INVENTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the example embodiments described herein can be made without departing from the spirit and scope of the present disclosure.

Figure 1:
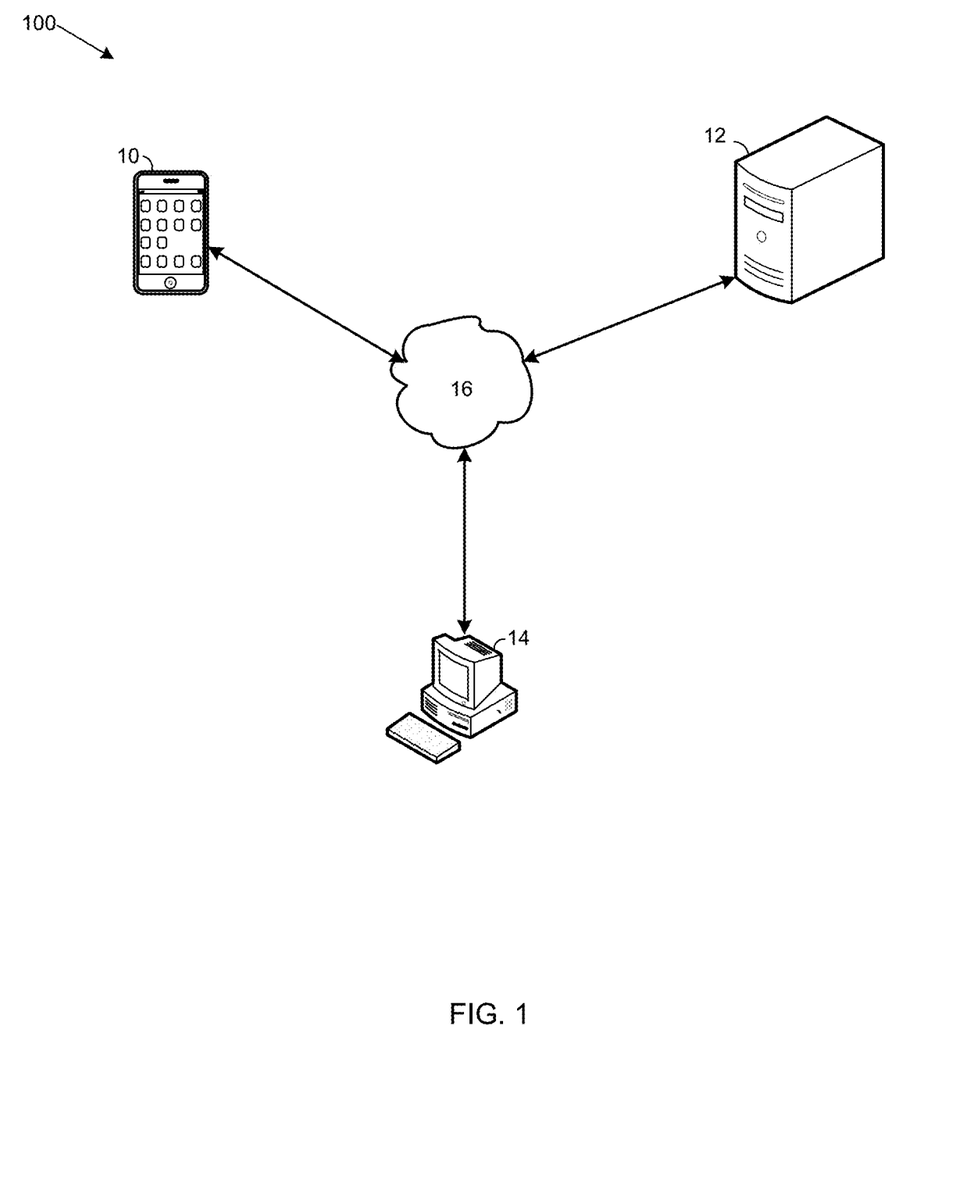
FIG. 1 is a schematic diagram of an example computing system for creating a synthetic speech detection algorithm and enhancing detection of fraudulent audio data using the algorithm according to an embodiment of the present disclosure.

FIG. 1 is a schematic diagram of an example computing system 100 for creating a synthetic speech detection algorithm and enhancing detection of fraudulent audio data using the algorithm according to an embodiment of the present disclosure. As shown in FIG. 1, the main elements of the system 100 include an electronic device 10, a server 12, and a personal computer (PC) 14 communicatively connected via a network 16.

In FIG. 1, the electronic device 10 may be any wireless hand-held consumer computing device capable of at least downloading applications over the Internet, running applications, capturing and storing data temporarily and/or permanently, and otherwise performing any and all functions described herein by any computer, computer system, server or computing device included in the system 100. One example of the electronic device 10 is a smart phone. Other examples include, but are not limited to, a cellular phone, a tablet computer, a phablet computer, a laptop computer, and any type of hand-held consumer computing device having wired or wireless networking capabilities capable of performing the functions, methods, and/or algorithms described herein.

The server 12 can be, for example, any type of server or computer implemented as a network server or network computer. The computer 14 can be any type of personal computer. Alternatively, the server 12 and the personal computer 14 can be any type of wireless hand-held consumer computing device capable of at least downloading applications over the Internet, running applications, capturing and storing data temporarily and/or permanently, and otherwise performing any and all functions, methods and/or algorithms described herein by any computer. computer system, server or computing device included in the system 100. The server 12 may alternatively be a personal computer while the personal computer 14 may alternatively be a server or computer implemented as a network server or network computer.

The network 16 may be implemented as a 5G communications network. Alternatively, the network 16 may be implemented as any wireless network including, but not limited to, 4G, 3G, Wi-Fi, Global System for Mobile (GSM), Enhanced Data for GSM Evolution (EDGE), and any combination of a LAN, a wide area network (WAN) and the Internet. The network 16 may also be any type of wired network or a combination of wired and wireless networks.

It is contemplated by the present disclosure that the number of electronic devices 10, servers 12, and personal computers 14 is not limited to the number shown in the system 100. Rather, any number of electronic devices 10, servers 12, and personal computers 14 may be included in the system 100.

Figure 2:
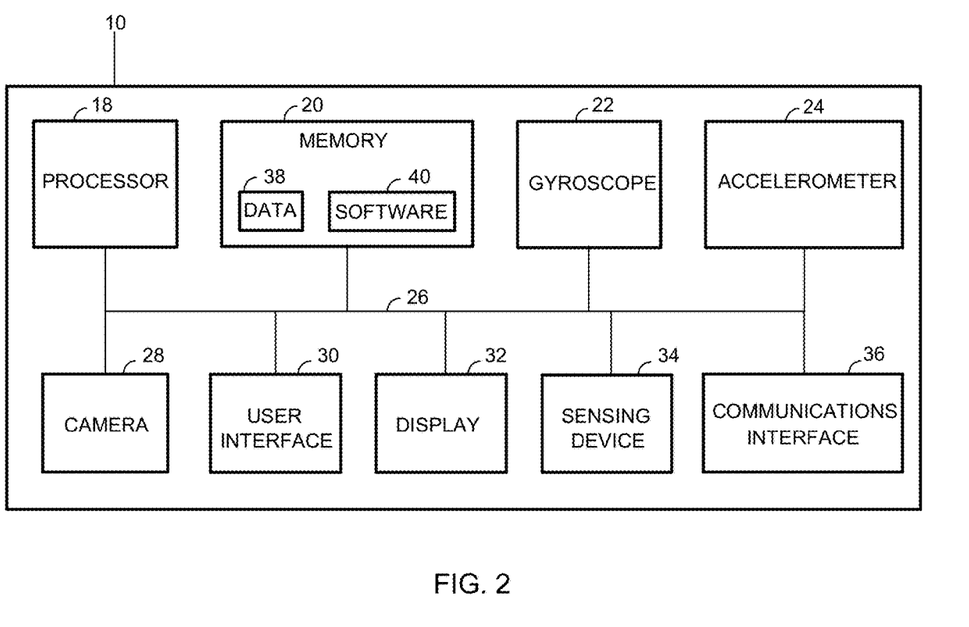
FIG. 2 is a more detailed schematic diagram illustrating an example electronic device in the system of FIG. 1.

FIG. 2 is a more detailed schematic diagram illustrating the electronic device 10 in the computing system 100 shown in FIG. 1. The electronic device 10 includes components such as, but not limited to, one or more processors 18, a memory 20, a gyroscope 22, an accelerometer 24, a bus 26, a camera 28, a user interface 30, a display 32, a sensing device 34, and a communications interface 36. It should be understood that the electronic device 10 may alternatively include more components or fewer components. For example, the electronic device 10 may not include the gyroscope 22, the accelerometer 24, and/or the camera 28. General communication between the components in the electronic device 10 is provided via the bus 26.

The processor 18 executes software instructions, or computer programs, stored in the memory 20. As used herein, the term processor is not limited to just those integrated circuits referred to in the art as a processor, but broadly refers to a computer, a microcontroller, a microcomputer, a programmable logic controller, an application specific integrated circuit, and any other programmable circuit capable of executing at least a portion of the functions and/or methods described herein. The above examples are not intended to limit in any way the definition and/or meaning of the term "processor."

The memory 20 may be any non-transitory computer-readable recording medium. Non-transitory computer-readable recording media may be any tangible computer-based device implemented in any method or technology for short-term and long-term storage of information or data. Moreover, the non-transitory computer-readable recording media may be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), and disc drive or the like. Furthermore, the non-transitory computer-readable recording media may be implemented as smart cards, SIMs, any type of physical and/or virtual storage, or any other digital source such as a network or the Internet from which computer programs, applications or executable instructions can be read.

The memory 20 may be used to store any type of data 38, for example, data records of speakers. Each data record is typically for a respective speaker. The data record for each speaker may include data such as, but not limited to, the speaker's name, captured voice audio data of the speaker, and phrases to be recited while capturing voice audio data of the speaker.

Voice biometric data may be captured by the electronic device 10 by recording a speaker speaking a phrase. Captured voice biometric data may be temporarily or permanently stored in the electronic device 10 or in any device capable of communicating with the electronic device 10 via the network 16. Voice biometric data is captured as audio data. Audio signals are audio data. As used herein, capture means to record temporarily or permanently, any data including, for example, voice biometric data or image data of a person.

The term "personal data" as used herein includes any demographic information regarding a user as well as contact information pertinent to the speaker. Such demographic information includes, but is not limited to, a speaker's name, age, date of birth, street address, email address, citizenship, marital status, and contact information. Contact information can include devices and methods for contacting the speaker.

Additionally, the memory 20 can be used to store any type of software 40. As used herein, the term "software" is intended to encompass an executable computer program that exists permanently or temporarily on any non-transitory computer-readable recordable medium that causes the electronic device 10 to perform at least a portion of the functions, methods, and/or algorithms described herein. Application programs are software and include, but are not limited to, operating systems, Internet browser applications, machine learning algorithms (MLA), synthetic speech detection algorithms for enhancing detection of fraudulent voice audio data, and any other software and/or any type of instructions associated with algorithms, processes, or operations for controlling the general functions and operations of the electronic device 10. The software may also include computer programs that implement buffers and use RAM to store temporary data.

A machine learning algorithm (MLA) may be trained to create a machine learning model for enhancing detection of fraudulent audio data. Such machine learning algorithms include, but are not limited to, deep neural networks and statistical models. Machine learning models have parameters which are modified during training to optimize functionality of the models trained using a machine learning algorithm (MLA).

The gyroscope 22 and the accelerometer 24 generate data regarding rotation and translation of the electronic device 10 that may be communicated to the processor 18 and the memory 20 via the bus 26. The processor 18 may use the generated data to at least calculate the acceleration of the electronic device 10 and calculate the orientation and position of the electronic device 10.

The camera 28 can be one or more imaging devices configured to record image data of a user while utilizing the electronic device 10. Moreover, the camera 28 is capable of recording image data under any lighting conditions including infrared light. Image data may be a digital image, a sequence of digital images, or a video.

The camera 28 may be integrated into the electronic device 10 as one or more front-facing cameras and/or one or more rear facing cameras that each incorporates a sensor, for example and without limitation, a CCD or CMOS sensor. Alternatively, the camera 28 can be external to the electronic device 10.

The user interface 30 and the display 32 allow interaction between a user and the electronic device 10. The display 32 may include a visual display or monitor that displays information. For example, the display 32 may be a Liquid Crystal Display (LCD), an active matrix display, plasma display, or cathode ray tube (CRT). The user interface 30 may include a keypad, a keyboard, a mouse, an illuminator, a signal emitter, a microphone, the camera 28, and/or speakers.

Moreover, the user interface 30 and the display 32 may be integrated into a touch screen display. Accordingly, the display may also be used to show a graphical user interface, which can display various data and provide "forms" that include fields that allow for the entry of information by the user. Touching the screen at locations corresponding to the display of a graphical user interface allows the person to interact with the electronic device 10 to enter data, change settings, control functions, etc. Consequently, when the touch screen is touched, the user interface 32 communicates this change to the processor 18, and settings can be changed or user entered information can be captured and stored in the memory 20. The display 32 may function as an illumination source to apply illumination to an object while image data for the object is captured.

The sensing device 34 may include Radio Frequency Identification (RFID) components or systems for receiving information from other devices in the system 100 and for transmitting information to other devices in the system 100. The sensing device 34 may alternatively, or additionally, include components with Bluetooth, Near Field Communication (NFC), Zigbee communication protocol, infrared, or other similar capabilities. Communications between the electronic device 10 and other devices (not shown) may occur via NFC, RFID, Bluetooth, Zigbee communication protocol, or the like only so a network connection from the electronic device 10 is unnecessary.

The communications interface 36 may include various network cards, and circuitry implemented in software and/or hardware to enable wired and/or wireless communications with other electronic devices 10 (not shown), servers 12, and personal computers 14 via the network 16. Communications include, for example, conducting cellular telephone calls and accessing the Internet over the network 16. By way of example, the communications interface 36 may be a digital subscriber line (DSL) card or modem, an integrated services digital network (ISDN) card, a cable modem, or a telephone modem to provide a data communication connection to a corresponding type of telephone line. As another example, the communications interface 36 may be a local area network (LAN) card (e.g., for Ethernet.TM. or an Asynchronous Transfer Model (ATM) network) to provide a data communication connection to a compatible LAN. As yet another example, the communications interface 36 may be a wire or a cable connecting the electronic device 10 with a LAN, or with accessories such as, but not limited to, other computing devices. Further, the communications interface 36 may include peripheral interface devices, such as a Universal Serial Bus (USB) interface, a PCMCIA (Personal Computer Memory Card International Association) interface, and the like.

The communications interface 36 also allows the exchange of information across the network 16. The exchange of information may involve the transmission of radio frequency (RF) signals through an antenna (not shown). Moreover, the exchange of information may be between the electronic device 10, the server 12, the personal computer 14, other computing devices (not shown), and other computer systems (not shown) capable of communicating over the network 16.

Examples of other computer systems (not shown) include computer systems of service providers such as, but not limited to, financial institutions, medical facilities, national security agencies, merchants, and authenticators. The computing devices (not shown) may be associated with any user or with any type of entity including, but not limited to, commercial and non-commercial entities.

The server 12 and the personal computer 14 may include the same or similar components as described herein with regard to the electronic device 10, or may include more or less components than described herein with regard to the electronic device 10. For example, the server 12 may not include an accelerometer, a gyroscope, or both. The server 12 and personal computer 14 are also electronic devices so may alternatively be referred to as such.

Figure 3:
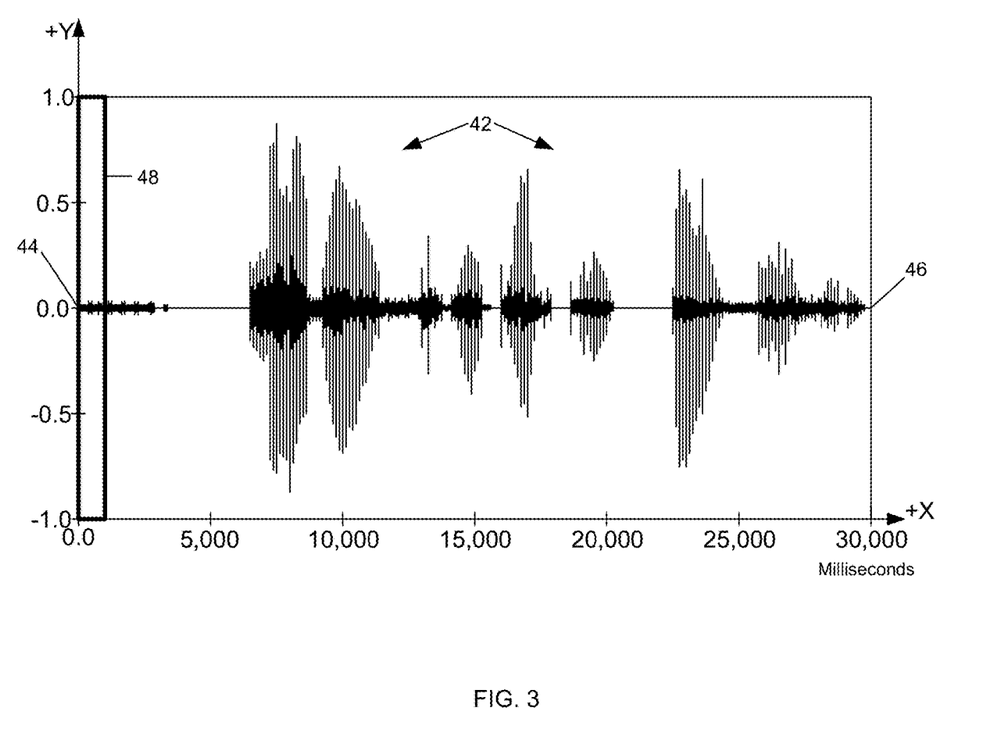
FIG. 3 is a diagram illustrating an example audio signal captured while a person spoke a phrase.

FIG. 3 is a diagram illustrating an example audio signal 42 captured while a person spoke a phrase. The audio signal 42 may be captured by the electronic device 10 while being operated by the speaker or another person. The audio signal 42 may be captured as a continuous analog signal and converted into an audio signal by sampling at any frequency within the range of 8 kHz and 96 kHz. The audio signal 42 may be provided in Pulse Code Modulation (PCM) in 8, 16, or 24 bits or in compressed format, for example, in flac, mp3, a-law, mu-law and amr, and may be filtered using a pre-emphasis filter that amplifies the high-frequency content of the data.

The audio signal 42 is plotted on a Cartesian coordinate system having X and Y-axes. The X-axis represents the number of discrete elements included in the captured audio signal 42 in which each discrete element is captured at a rate, in seconds, equal to the inverse of a sampling frequency. The Y-axis represents the normalized values of the discrete elements of the signal 42. Alternatively, the Y-axis may represent the actual values of the discrete elements in the signal 42. The audio signal 42 extends from the origin 44 to a terminus 46 and has a duration of about three (3) seconds. The duration of the audio signal 42 depends on the length of the spoken phrase which may also vary.

A temporal window 48 is located in an initial position flush with the origin 44 and has a duration of twenty-five (25) milliseconds. Alternatively, the temporal window 44 may be any duration. The optimal duration is fine tuned on a development database. The window 44 is translated in the positive direction along the X-axis over the duration of the signal 42 in ten (10) millisecond increments. Consequently, the temporal window 48 occupies many different positions over the signal 42. The 10-millisecond increment is the frame rate which may be any value that facilitates calculating signal features as described herein.

The window 48 can be implemented as a mathematical function that multiplies the audio signal 42 by a window function. That is, a window function that is zero-valued outside of a chosen temporal interval and symmetric around the middle of the interval. The non-zero temporal interval of the window function is translated by the frame rate over the duration of the audio signal 42. The window function can be a Hamming window function. However, any window function may alternatively be used that facilitates signal feature extraction as described herein.

In each different position, the window 48 includes a different portion of the signal 42, which portion is processed, for example, by a feature extraction computer program to calculate signal features including, but not limited to, mel-sprectrum Fourier coefficients. Alternatively, any other type of coefficients representative of the audio signal be used.

Generally, a phrase spoken by a speaker can be referred to as an utterance. Example phrases include but are not limited to, "My voice is my password, verify me" and "I have several busy children, verify me." Alternatively, a phrase may be a single letter or number, a group of letters or numbers, any combination of letters and numbers, or one or more sentences. Any phrase may be spoken to generate the audio signal 42.

The audio signal 42 is audio data that includes voice biometric data of a speaker and information about a phrase spoken by the speaker. Audio signals generated by different people speaking the same or different phrase include different voice biometric data and information regarding the spoken phrase. As a result, audio signals generated by different people speaking the same or different phrase are different. Because the audio signals contain biometric data about a speaker and information about a spoken phrase, feature matrices created from such signals are a function of voice biometric data and information about a spoken phrase.

Figure 4:
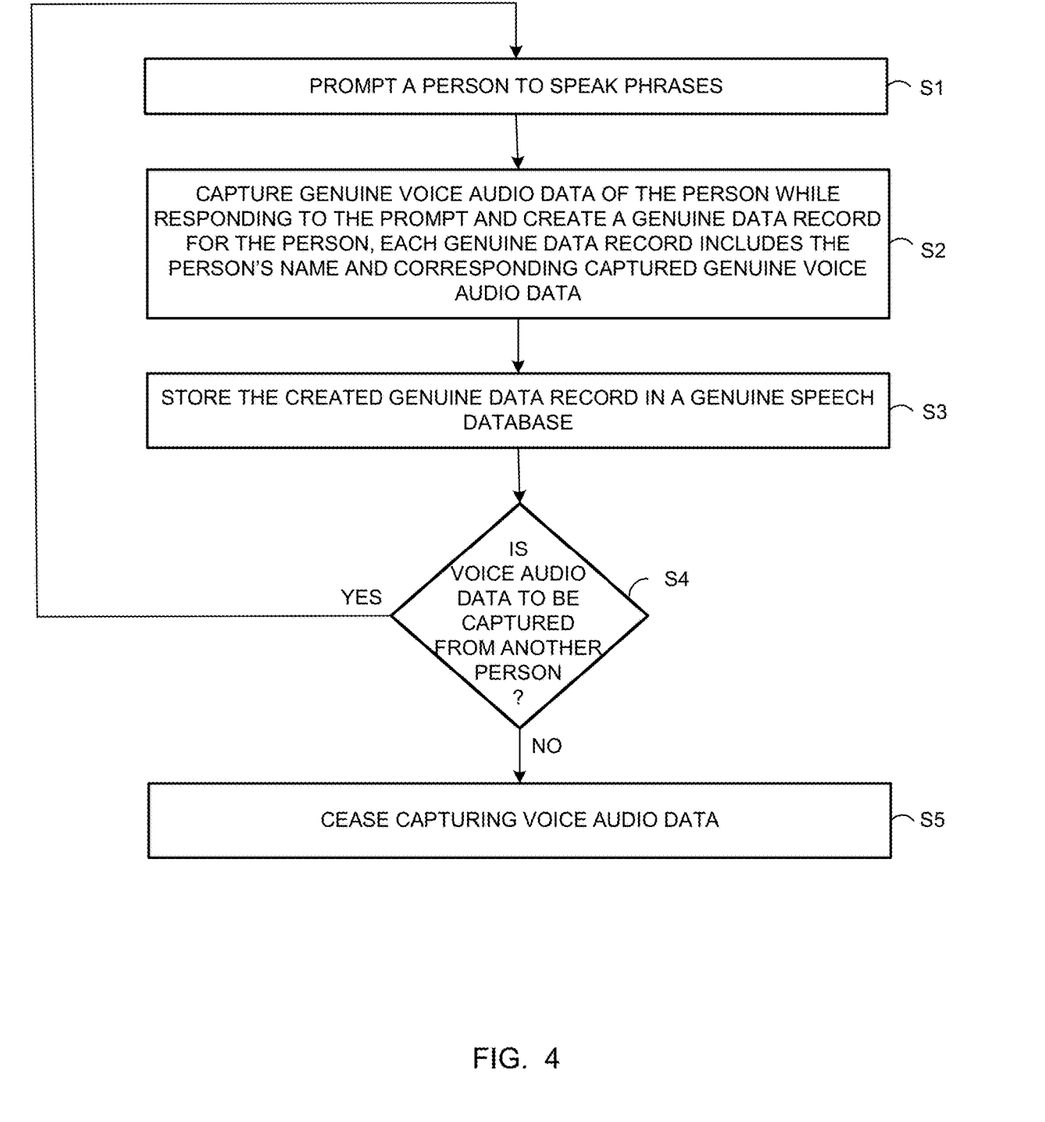
FIG. 4 is a flowchart illustrating an example method and algorithm for creating a database of genuine voice audio data of speakers.

FIG. 4 is a flowchart illustrating an example method and algorithm for creating a database of genuine voice audio data of speakers. The database can be referred to as a genuine speech database. FIG. 4 illustrates example operations performed when the electronic device 10 runs software 40 stored in the memory 20 to capture genuine voice audio data of speakers and to store the captured audio data in the memory 20. A speaker may cause the electronic device 10 to run the software 40 or the electronic device 10 may automatically run the software 40.

In step S1, the software 40 executed by the processor 18 causes the electronic device 10 to prompt a person to speak phrases. The person may be prompted by, for example, a message displayed on the electronic device 10 instructing the person to speak one or more phrases, an audio prompt emitted by the electronic device 10, or vibrations of the electronic device 10. Example phrases include but are not limited to, "My voice is my password, verify me" and "I have several busy children, verify me." Alternatively, a phrase may be a single letter or number, a group of letters or numbers, any combination of letters and numbers, or one or more sentences. Any phrase may be spoken to generate the audio signal 42. The person speaking the one or more phrases may be referred to herein as the speaker.

In step S2, the software 40 executed by the processor 18 causes the electronic device 10 to capture genuine voice audio data of the person while responding to the prompt, and to create a genuine voice audio data record for the person. The genuine voice audio data record includes, but is not limited to, the captured genuine voice audio data and the speaker's name.

Next, in step S3, the software 40 executed by the processor 18 causes the electronic device 10 to store the created genuine voice audio data record in a genuine speech database, for example, in the memory 20. The genuine speech database may alternatively, or additionally, be stored in any other computer or computing device in the system 100 capable of communicating with the electronic device 10 via the network 16. In step S4, the software 40 executed by the processor 18 causes the electronic device 10 to determine if voice audio data is to be captured from another speaker. If so, in step S1, the software 40 executed by the processor 18 causes the electronic device 10 to prompt the other speaker to speak phrases. Otherwise, in step S5, the software 40 executed by the processor 18 causes the electronic device 10 to cease capturing voice audio data by, for example, ceasing to display the message instructing the speaker to speak one or more phrases.

Figure 5:
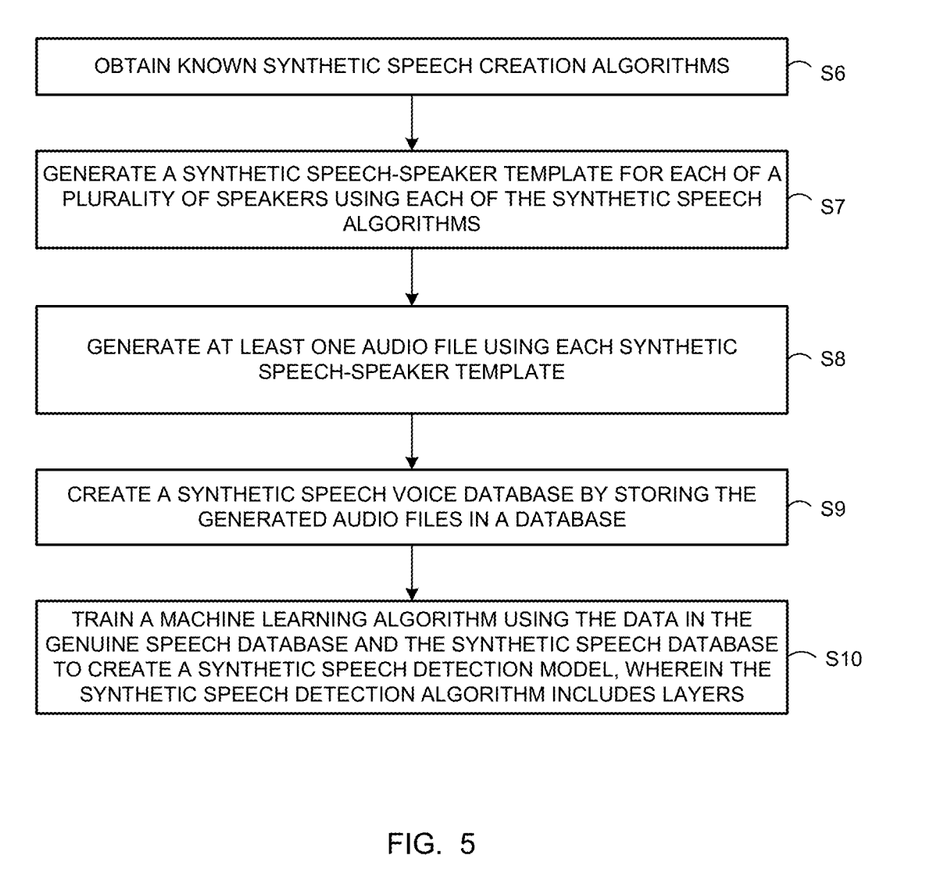
FIG. 5 is a flowchart illustrating an example method and algorithm for creating a synthetic speech database and training a machine learning algorithm using the data in the synthetic speech database.

FIG. 5 is a flowchart illustrating an example method and algorithm for creating a synthetic speech database and training a machine learning algorithm using the data in the synthetic speech database. FIG. 5 illustrates example operations performed when the electronic device 10 runs software 40 stored in the memory 20 to capture synthetic speech audio data of speakers. A speaker may cause the electronic device 10 to run the software 40 or the electronic device 10 may automatically run the software 40.

In step S6, known synthetic speech creation algorithms are obtained and the software 40 executed by the processor 18 causes the electronic device 10 to install the synthetic speech creation algorithms in, for example, the memory 20. Synthetic speech is any type of artificially generated human speech or audio data. Synthetic speech is any speech or audio data that is not generated by a human.

Next, in step S7, the software 40 executed by the processor 18 causes the electronic device 10 to generate a synthetic speech-speaker template for each of a plurality of speakers using each of the synthetic speech creation algorithms. That is, each obtained synthetic speech creation algorithm is used to generate a synthetic speech-speaker template for each speaker. For example, if there are five (5) synthetic speech creation algorithms, five synthetic speech-speaker templates are generated for each speaker.

Next, in step S8, the software 40 executed by the processor 18 causes the electronic device 10 to generate at least one audio file using each synthetic speech-speaker template. In step S9, the software 40 executed by the processor 18 causes the electronic device 10 to create a synthetic speech voice database by storing the generated audio files in a database. The synthetic speech database may be stored in the memory 20.

Next, in step S10, the software 40 executed by the processor 18 causes the electronic device 10 to train a machine learning algorithm (MLA) using the data in the genuine speech database and the data in the synthetic speech database to create a synthetic speech detection algorithm. The synthetic speech detection algorithm includes layers such as, but not limited to, an input layer, a normalization layer, a convolutional layer, a pooling layer, an activation layer, a dropout layer, and an output layer. The synthetic speech detection algorithm facilitates detecting voice audio data generated by any of the obtained synthetic speech creation algorithms. Voice cloning algorithms are examples of synthetic speech detection algorithm. Cloned voice detection algorithms are typically used in Voice Cloning Detection (VCD) systems to detect fraudulent utterances generated by voice cloning algorithms.

Synthesized speech systems are known to train two-classes of classification models able to distinguish between bona fide utterances and fraudulent utterances generated synthetically by a synthetic speech creation algorithm. Such fraudulent utterances are also synthesized speech. Training the synthetic speech creation algorithm requires a training database that includes bona fide and fraudulent utterances. Fraudulent utterances are synthesized speech that can be generated by one or more synthetic speech creation algorithms. Synthetic speech systems are known to be more accurate in detecting fraudulent utterances generated by a previously seen synthetic speech creation algorithm than generated by an unencountered synthetic speech creation algorithm.

Updating a synthetic speech detection algorithm to detect fraudulent utterances generated by a previously unencountered synthetic speech creation algorithm requires obtaining the unencountered algorithm, creating training data using the unencountered algorithm, and completely retraining from scratch the synthetic speech detection algorithm using the created training data and the data from the training database used to initially train the synthetic speech detection algorithm. The updates are complex, time consuming, and expensive to implement and are required for each unencountered synthetic speech creation algorithm. Additionally, the rate at which new synthetic speech creation algorithms are being developed is increasing which compounds the problems associated with updating synthetic speech detection systems.

To address these problems a machine learning algorithm can be created to enhance detection of fraudulent audio data. It is contemplated by the present disclosure that an electronic device can generate audio data using a synthetic speech creation algorithm and process the generated audio data using a synthetic speech detection algorithm. The electronic device can determine whether the synthetic speech detection algorithm detects the generated audio data, generate additional audio data using the synthetic speech creation algorithm, and create a database including the generated audio data and genuine data.

In response to determining the synthetic speech detection algorithm failed to detect the generated audio data, the electronic device can divide the synthetic speech detection algorithm into a first algorithm and a second algorithm. The second algorithm can be fine-tuned using the data in the created database. The fine-tuned second algorithm is different than the second algorithm. The first algorithm and the fine-tuned second algorithm can be combined to create a fine-tuned synthetic speech detection algorithm for enhancing detection of fraudulent audio data generated by the synthetic speech creation algorithm.

Fine-tuning is the process of adjusting an algorithm previously trained to perform an original task to perform a new and different task. The adjustments are typically minor but may be more extensive depending on the new and different task. The fine-tuned algorithm can be considered a new algorithm. Fine-tuning allows taking advantage of the previously trained algorithm by using some parameters of the previously trained model in the new algorithm.

Figure 6:
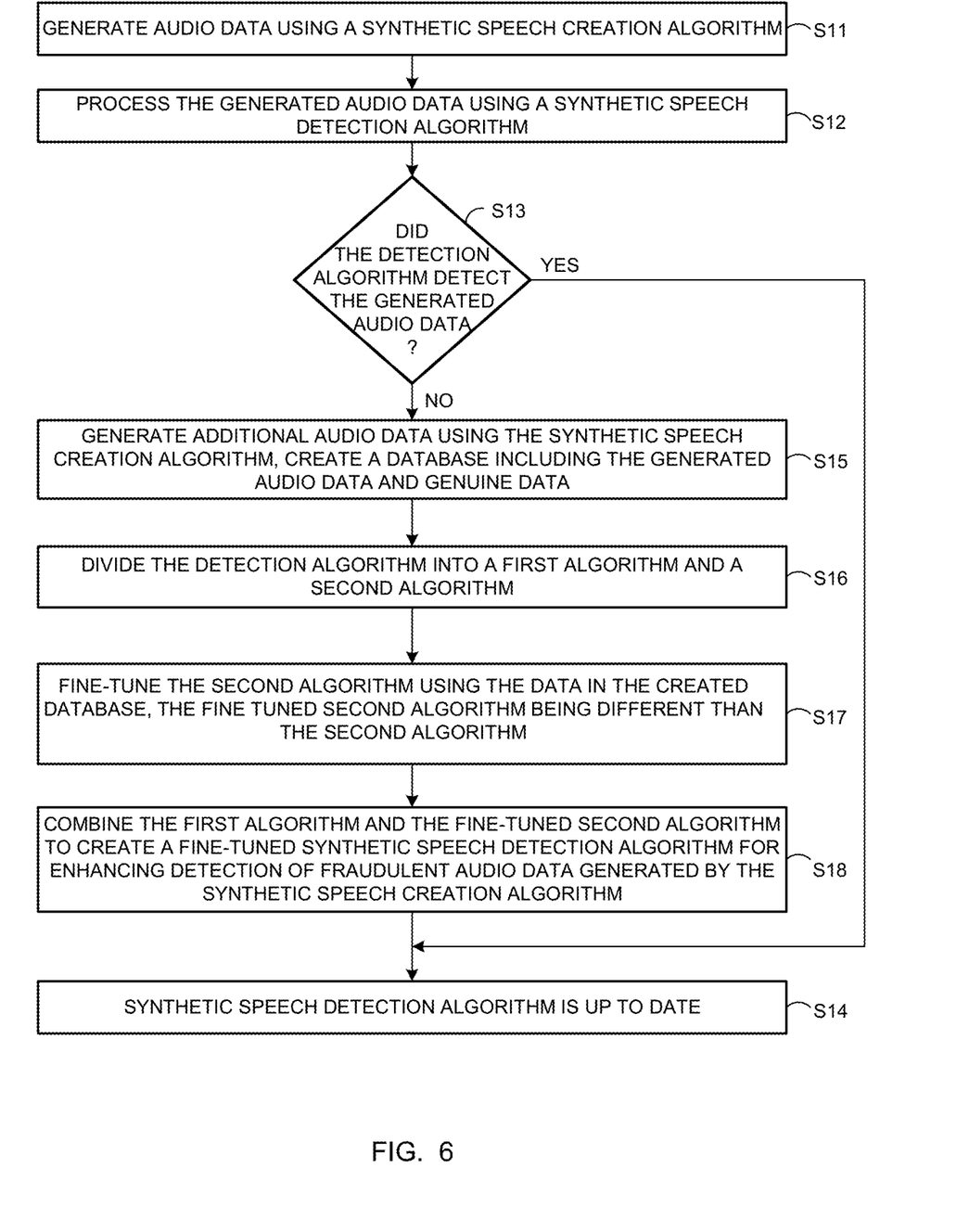
FIG. 6 is a flowchart illustrating an example method and algorithm for creating a synthetic speech detection algorithm to enhance detecting fraudulent audio data generated by an unencountered synthetic speech creation algorithm.

FIG. 6 is a flowchart illustrating an example method and algorithm for creating a synthetic speech detection algorithm to enhance detection of fraudulent audio data generated by a synthetic speech creation algorithm. FIG. 6 illustrates example operations performed when the electronic device 10 runs software 40 stored in the memory 20. A user may cause the electronic device 10 to run the software 40 or the electronic device 10 may automatically run the software 40.

In step S11, the software 40 executed by the processor 18 causes the electronic device 10 to generate audio data using a synthetic speech creation algorithm. Synthetic speech created by the algorithm may not have been processed by the electronic device 10 previously. As a result, the synthetic speech created by the algorithm may not have been encountered by a synthetic speech detection algorithm operated by the electronic device 10. The synthetic speech detection algorithm may be, for example, the synthetic speech detection algorithm described herein with regard to the flowchart illustrated in FIG. 5.

The synthetic speech creation algorithm may be a recently developed algorithm that was not available when the synthetic speech detection algorithm operated by the electronic device 10 was trained. In step S12, the software 40 executed by the processor 18 causes the electronic device 10 to process the generated audio data using the synthetic speech detection algorithm. The synthetic speech detection algorithm includes layers such as, but not limited to, an input layer, a normalization layer, a convolutional layer, a pooling layer, an activation layer, a dropout layer, and an output layer.

Next, in step S13, the software 40 executed by the processor 18 causes the electronic device 10 to determine whether or not the synthetic speech detection algorithm detected the audio data generated by the unencountered synthetic speech creation algorithm during processing. If the synthetic speech detection algorithm detected the generated audio data, then in step S14, the software 40 executed by the processor 18 causes the electronic device 10 to determine that the synthetic speech detection algorithm is up-to-date so does not require fine-tuning.

However, if the synthetic speech detection algorithm failed to detect the generated audio data, in step S15, the software 40 executed by the processor 18 causes the electronic device 10 to generate additional audio data using the synthetic speech creation algorithm, and to create a database including the generated data and genuine audio data.

Next, in step S16, the software 40 executed by the processor 18 causes the electronic device 10 to divide the synthetic speech detection algorithm into a first algorithm and a second algorithm. The first algorithm includes a first set of layers that execute a first process and the second algorithm includes a second set of layers that execute a second process. The first set of layers can remain the same while the second set of layers can be changed. Alternatively, the first set of layers may be changed and the second set may remain unchanged.

In step S17, the software 40 executed by the processor 18 causes the electronic device 10 to fine-tune the second algorithm using the data in the created database. The fine-tuned second algorithm is different than the second algorithm. It is contemplated by the present disclosure that the data used for fine-tuning is substantially less than the data required by contemporary methods for retraining synthetic speech detection algorithms, for example, voice cloning detection algorithms.

Next, in step S18, the software 40 executed by the processor 18 causes the electronic device 10 to combine the first algorithm and the fine-tuned second algorithm to create a fine-tuned synthetic speech detection algorithm. The fine-tuned synthetic speech detection algorithm enables enhancing the detection of fraudulent audio data generated by the previously unencountered synthetic speech creation algorithm.

Next, in step S14, the software 40 executed by the processor 18 causes the electronic device 10 to determine the fine-tuned synthetic speech detection algorithm is up-to-date so does not require additional fine-tuning. The fine-tuned synthetic speech detection algorithm and the fine-tuned second algorithm may be stored, for example, in the memory 20. It is contemplated by the present disclosure that both the fine-tuned second algorithm and the fine-tuned synthetic speech detection algorithm can be cloned voice detection algorithms for detecting fraudulent audio data generated by a voice cloning algorithm.

It is contemplated by the present disclosure that a fine-tuned second algorithm may be created for any number of unencountered synthetic speech creation algorithms. The fine-tuned second algorithms may be stored in the memory 20. It is contemplated by the present disclosure that any of the created fine-tuned second algorithms may be combined with the first algorithm, as described herein with regard to the flowchart illustrated in FIG. 6, to create a fine-tuned synthetic speech detection algorithm for a corresponding unencountered synthetic speech creation algorithm. The created fine-tuned synthetic speech detection algorithms may also be stored in the memory 20.

Using the method and algorithm for creating an algorithm to enhance detection of fraudulent audio data requires using less data than contemporary methods of training synthetic speech detection algorithms, thus enabling quickly updating a synthetic speech detection algorithm. As a result, the method and algorithm for creating an algorithm to enhance detection of fraudulent audio data facilitates reducing the data, time, and costs required to update a synthetic speech detection algorithm to detect audio data generated by an unencountered synthetic speech creation algorithm.

Figure 7:
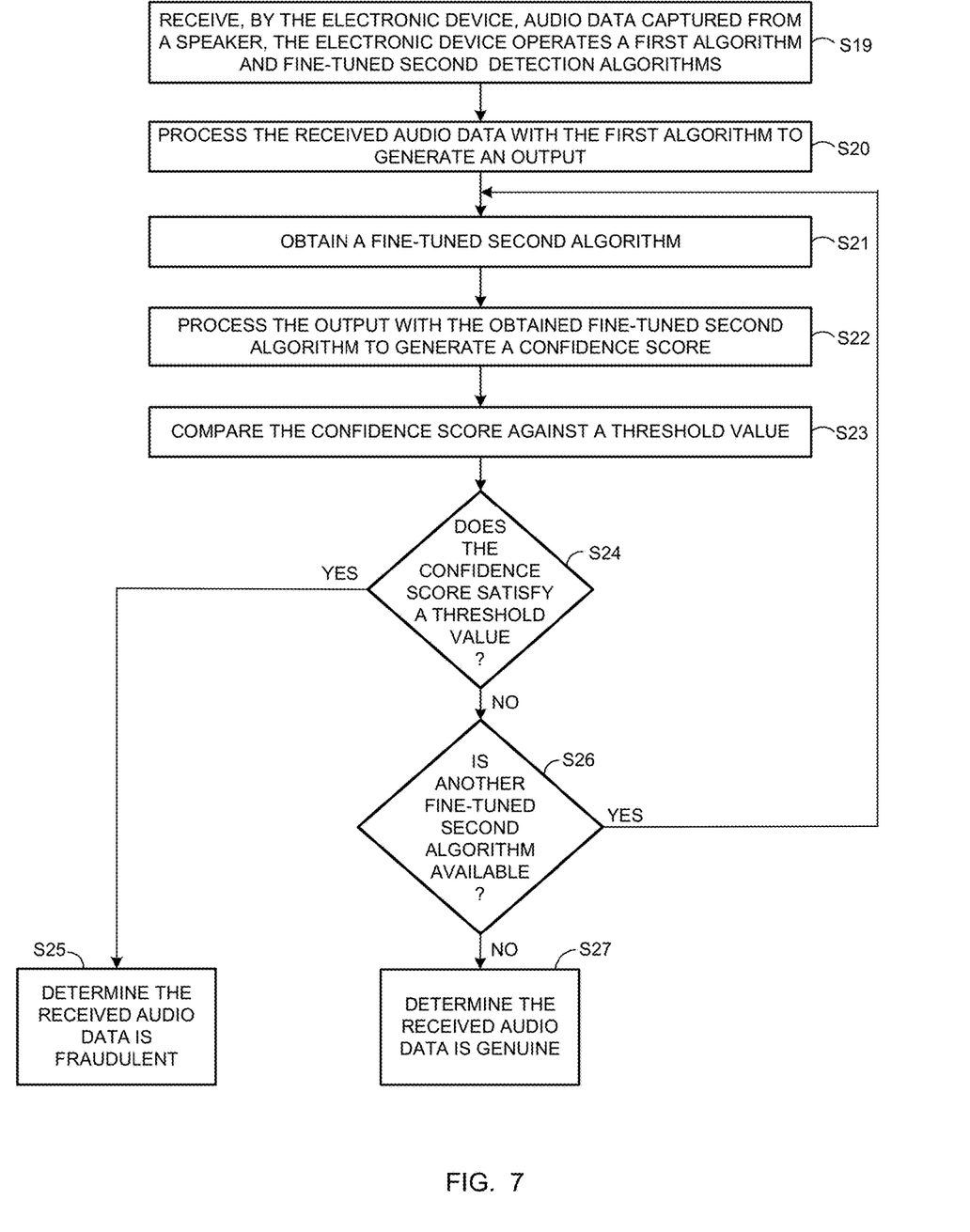
FIG. 7 is a flowchart illustrating an example method and algorithm for enhancing detection of fraudulent audio data using a fine-tuned synthetic speech detection algorithm.

FIG. 7 is a flowchart illustrating an example method and algorithm for enhancing detection of fraudulent audio data using a fine-tuned synthetic speech detection algorithm, for example, the fine-tuned synthetic speech detection algorithm described herein with regard to the flowchart illustrated in FIG. 6. FIG. 7 illustrates example operations performed when the electronic device 10 runs software 40 stored in the memory 20. A speaker may cause the electronic device 10 to run the software 40 or the electronic device 10 may automatically run the software 40.

In step S19, the software 40 executed by the processor 18 causes the electronic device 10 to receive audio data captured from a speaker. The electronic device 10 operates the first algorithm as described herein with regard to the flowchart illustrated in FIG. 6 and several fine-tuned second algorithms. Next, in step S20, the software 40 executed by the processor 18 causes the electronic device 10 to process the received audio data using the first algorithm to generate an output.

In step S21, the software 40 executed by the processor 18 causes the electronic device 10 to obtain a fine-tuned second algorithm from, for example, the memory 20, and in step S22, to process the output using the obtained fine-tuned second algorithm to generate a confidence score. In step S23 the software 40 executed by the processor 18 causes the electronic device 10 to compare the confidence score against a threshold value, and in step S24, to determine whether the confidence score satisfies the threshold value.

The threshold value may be satisfied when a calculated confidence score is less than or equal to the threshold value. Other threshold values may be satisfied when the calculated confidence score is equal to or greater than the threshold value. Alternatively, the threshold value may include multiple threshold values, each of which is required to be satisfied to satisfy the threshold value.

When the confidence score satisfies the threshold value, in step S25, the software 40 executed by the processor 18 causes the electronic device 10 to determine the received audio data is fraudulent. However, when the confidence score does not satisfy the threshold value, in step S26, the software 40 executed by the processor 18 causes the electronic device 10 to determine whether another fine-tuned second algorithm is available. If yes, in step S21, the software 40 executed by the processor 18 causes the electronic device 10 to obtain another fine-tuned second algorithm. Otherwise, in step S27, the software 40 executed by the processor 18 causes the electronic device 10 to determine the received audio data is genuine.

Using the method and algorithm for enhancing detection of fraudulent audio data enables quickly generating accurate and trustworthy results regarding authenticity of audio data received during a voice biometric authentication transaction and facilitates reducing time wasted and costs incurred as a result of successful spoofing.

The example methods and algorithms described herein may be conducted entirely by the electronic device 10; partly by the electronic device 10 and partly by the server 12 via the network 16; or partly by the electronic device 10, the server 12 and the personal computer 14 via the network 16. For example, the personal computer 14 may use a machine learning algorithm to create a synthetic speech detection algorithm for use in conducting authentication transactions, while the server 12 may conduct authentication transactions using the trained synthetic speech detection algorithm, or vice versa. Moreover, the example methods described herein may be conducted entirely on other electronic devices 10 (not shown) or other servers 12 (not shown). It is contemplated by the present disclosure that the example methods and algorithms described herein may be conducted using any combination of computers, computer systems, and computing devices (not shown). Furthermore, data described herein as being stored in the electronic device 10 may alternatively, or additionally, be stored in the server 12, the personal computer 14, or in any computer system (not shown) or computing device (not shown) operable to communicate with the electronic device 10 over the network 16.

Additionally, the example methods and algorithms described herein may be implemented with any number and organization of computer program components. Thus, the methods and algorithms described herein are not limited to specific computer-executable instructions. Alternative example methods and algorithms may include different computer-executable instructions or components having more or less functionality than described herein.

The example methods and/or algorithms described above should not be considered to imply a fixed order for performing the method and/or algorithm steps. Rather, the method and/or algorithm steps may be performed in any order that is practicable, including simultaneous performance of at least some steps. Moreover, the method and/or algorithm steps may be performed in real time or in near real time. It should be understood that, for any method and/or algorithm described herein, there can be additional, fewer, or alternative steps performed in similar or alternative orders, or in parallel, within the scope of the various embodiments, unless otherwise stated. Furthermore, the invention is not limited to the embodiments of the methods and/or algorithms described above in detail.

What is claimed is:

1. A method of creating an algorithm to enhance detection of fraudulent audio data comprising the steps of:
    generating, by an electronic device, audio data using a synthetic speech creation algorithm;
    processing the generated audio data using a synthetic speech detection algorithm;
    determining whether the synthetic speech detection algorithm detects the generated audio data;
    in response to determining the synthetic speech detection algorithm failed to detect the generated audio data, generating additional audio data using the synthetic speech creation algorithm and creating a database including the generated audio data and genuine data;
    dividing the synthetic speech detection algorithm into a first algorithm and a second algorithm;
    fine-tuning the second algorithm using the generated audio data and genuine data in the created database, the fine-tuned second algorithm being different than the second algorithm; and
    combining the first algorithm and the fine-tuned second algorithm to create a fine-tuned synthetic speech detection algorithm for enhancing detection of fraudulent audio data generated by the synthetic speech creation algorithm.

2. The method according to claim 1, further comprising determining the synthetic speech detection algorithm is capable of detecting fraudulent audio data using audio data generated by the synthetic speech creation algorithm, when the synthetic speech detection algorithm detects the generated audio data.

3. The method according to claim 1, further comprising the step of creating the synthetic speech detection algorithm.

4. The method according to claim 3, wherein the synthetic speech detection algorithm is a voice cloning algorithm.

5. An electronic device for creating an algorithm to enhance detection of fraudulent audio data comprising:
    a processor; and
    a memory configured to store data, said electronic device being associated with a network and said memory being in communication with said processor and having instructions stored thereon which, when read and executed by said processor, cause said electronic device to:
    generate audio data using a synthetic speech creation algorithm;
    process the generated audio data using a synthetic speech detection algorithm;
    determine whether the synthetic speech detection algorithm detects the generated audio data;
    in response to determining the synthetic speech detection algorithm failed to detect the generated audio data generate additional audio data using the synthetic speech creation algorithm; and create a database including the generated audio data and genuine data;

divide the synthetic speech detection algorithm into a first algorithm and a second algorithm;

fine-tune the second algorithm using the generated audio data and genuine data in the created database, the fine-tuned second algorithm being different than the second algorithm; and combining the first algorithm and the fine-tuned second algorithm to create a fine-tuned synthetic speech detection algorithm for enhancing detection of fraudulent audio data generated by the synthetic speech creation algorithm.

6. The electronic device according to claim 5, wherein the instructions when read and executed by said processor, cause said electronic device to determine the detection algorithm is capable of detecting fraudulent audio data using audio data generated by the synthetic speech creation algorithm when the detection algorithm detects the generated audio data.

7. The electronic device according to claim 5, wherein the instructions when read and executed by said processor, cause said electronic device to create the synthetic speech detection algorithm.

8. The electronic device according to claim 7, wherein the synthetic speech creation algorithm is a voice cloning algorithm.

9. A non-transitory computer-readable recording medium in an electronic device for training an algorithm to enhance detection of fraudulent audio data, the non-transitory computer-readable recording medium storing instructions which when executed by a hardware processor cause the non-transitory recording medium to perform steps comprising:

generating audio data using a synthetic speech creation algorithm;

processing the generated audio data using a synthetic speech detection algorithm;

determining whether the synthetic speech detection algorithm detects the generated audio data;

in response to determining the detection algorithm failed to detect the generated audio data, generating additional audio data using the synthetic speech creation algorithm and; creating a database including the generated audio data and genuine data;

dividing the detection algorithm into a first algorithm and a second algorithm, wherein the first algorithm remains unchanged and the second algorithm is changeable;

fine-tuning the second algorithm using the generated audio data and genuine data in the created database, the fine-tuned second algorithm being different than the second algorithm; and combining the first algorithm and the fine-tuned second algorithm to create a fine-tuned synthetic speech detection algorithm for enhancing detection of fraudulent audio data generated by the synthetic speech creation algorithm.

10. The non-transitory computer-readable recording medium according to claim 9, wherein the instructions when read and executed by said processor, cause said non-transitory computer-readable recording medium to perform the step of determining the synthetic speech detection algorithm is capable of detecting fraudulent audio data using audio data generated by the synthetic speech creation algorithm, when the synthetic speech detection algorithm detects the generated audio data.

11. The non-transitory computer-readable recording medium according to claim 9, wherein the instructions when read and executed by said processor, cause said non-transitory computer-readable recording medium to perform the step of creating the synthetic speech detection algorithm.

12. The non-transitory computer-readable recording medium according to claim 11, wherein the synthetic speech creation algorithm is a voice cloning algorithm.

* * * * *